United States Patent
Moss et al.

(10) Patent No.: US 11,015,743 B2
(45) Date of Patent: May 25, 2021

(54) PRESSURE HOSE

(71) Applicant: Gates Corporation, Denver, CO (US)

(72) Inventors: Tom Moss, Denver, CO (US); William Grant, Denver, CO (US); Kyle Spring, Denver, CO (US); Ken Giovanetti, Denver, CO (US); Rick Hill, Denver, CO (US)

(73) Assignee: Gates Corporation, Denver, CO (US)

( * ) Notice: Subject to any disclaimer, the term of this patent is extended or adjusted under 35 U.S.C. 154(b) by 96 days.

(21) Appl. No.: 16/193,411

(22) Filed: Nov. 16, 2018

(65) Prior Publication Data
US 2019/0257449 A1    Aug. 22, 2019

Related U.S. Application Data

(60) Provisional application No. 62/632,350, filed on Feb. 19, 2018.

(51) Int. Cl.
*F16L 11/08* (2006.01)
*B32B 1/08* (2006.01)
(Continued)

(52) U.S. Cl.
CPC .............. *F16L 11/08* (2013.01); *B32B 1/08* (2013.01); *B32B 5/02* (2013.01); *B32B 7/02* (2013.01);
(Continued)

(58) Field of Classification Search
CPC ........ F16L 11/08; F16L 11/085; F16L 11/086; B32B 1/08; B32B 5/02; B32B 7/02;
(Continued)

(56) References Cited

U.S. PATENT DOCUMENTS 3,605,818 A * 9/1971 Balchan ................. B65H 54/00
                                                   138/126
3,784,441 A 1/1974 Kaempen
(Continued)

FOREIGN PATENT DOCUMENTS

DE          10334673 B3    2/2005

OTHER PUBLICATIONS

International Search Report and Written Opinion issued for PCT/US2019/018177, dated Jun. 21, 2019 by European Patent Office Search Authority, 17 pages.

*Primary Examiner* — Craig M Schneider
*Assistant Examiner* — David R Deal
(74) *Attorney, Agent, or Firm* — Alyssa K. Sandrowitz, Esq.

(57) ABSTRACT

Described herein are embodiments of a pressure hose having an improved reinforcement layer. In some embodiments, the reinforcement layer of the pressure hose has a reinforcement volumetric ratio (RVR) of greater than or equal to 110%. The reinforcement layer can include a plurality of braided beams, with each beam comprising a plurality of ends. In some embodiments, the plurality of ends within a beam are arranged in a multi-layer orientation. In some embodiments, the number of ends and the end orientation within each beam is identical amongst all beams in the reinforcement layer. The shape, size, and arrangement of the ends within a beam can all be adjusted to increase the surface area to volume ratio and, correspondingly, the RVR of the reinforcement layer.

28 Claims, 12 Drawing Sheets

(51) Int. Cl.
*B32B 5/02* (2006.01)
*B32B 7/02* (2019.01)
*B32B 27/12* (2006.01)

(52) U.S. Cl.
CPC ............ *B32B 27/12* (2013.01); *F16L 11/085* (2013.01); *F16L 11/086* (2013.01); *B32B 2262/02* (2013.01); *B32B 2262/10* (2013.01); *B32B 2262/103* (2013.01); *B32B 2262/106* (2013.01); *B32B 2307/732* (2013.01); *B32B 2597/00* (2013.01)

(58) Field of Classification Search
CPC . B32B 27/02; B32B 2262/02; B32B 2262/10; B32B 2262/103; B32B 2262/106; B32B 2307/732; B32B 2597/00
See application file for complete search history.

(56) References Cited

U.S. PATENT DOCUMENTS

| | | | | |
|---|---|---|---|---|
| 4,273,160 A * | 6/1981 | Lowles | ................ | F16L 11/088 138/124 |
| 5,316,046 A * | 5/1994 | Igarashi | ................ | F16L 11/086 138/125 |
| 5,772,938 A * | 6/1998 | Sharp | ................ | B29C 53/8075 264/137 |
| 6,807,988 B2 * | 10/2004 | Powell | ................ | F16L 11/082 138/125 |
| 9,360,138 B2 * | 6/2016 | Thomson | ................ | F16L 11/02 |
| 9,920,861 B2 * | 3/2018 | Gorilovskiy | ............ | B32B 5/028 |
| 10,066,767 B2 * | 9/2018 | Nonaka | ................ | B29C 48/21 |
| 2002/0112770 A1 * | 8/2002 | Fisher | ................ | F16L 11/081 138/137 |
| 2002/0151620 A1 * | 10/2002 | Jansen | ................ | C08J 5/10 523/176 |
| 2005/0241716 A1 * | 11/2005 | Nagy | ................ | F16L 11/083 138/123 |
| 2009/0065084 A1 | 3/2009 | Masarwa | | |
| 2009/0159145 A1 * | 6/2009 | Amstutz | ................ | F16L 11/08 138/126 |
| 2011/0162749 A1 | 7/2011 | Jeong | | |
| 2012/0111378 A1 * | 5/2012 | Brow | ................ | B29C 48/131 134/174 |
| 2017/0274603 A1 | 9/2017 | Iwata | | |

\* cited by examiner

PRESSURE HOSE

CROSS-REFERENCE TO RELATED APPLICATIONS

This application claims priority to U.S. Provisional Patent Application No. 62/632,350, filed Feb. 19, 2018, the entirety of which is hereby incorporated by reference.

TECHNICAL FIELD

The present disclosure relates to an improved pressure hose, and more specifically, to an improved pressure hose having a reinforcement layer employing a "superpack" construction that provides the reinforcement layer with a reinforcement volumetric ratio (RVR) greater than 110%. Other features of the improved pressure hose include a single layer reinforcement layer having an RVR greater than 126%, and a double layer reinforcement layer wherein both layers of the reinforcement layer exhibit a net negative length change during operation.

BACKGROUND

Pressure hoses comprising a braided reinforcement layer have been known for years. The general construction of previously known reinforcement layers has generally included bundling a group of individual ends (also referred to as strands) into individual beams, and then braiding a plurality of beams around the circumference of an internal tube layer. Variations between previously known braided reinforcement layers could be seen in, for example, the material used for the ends, the number of ends within a beam, the manner in which the ends were arranged within a beam, the type of braiding employed, etc.

Despite the variously known braided reinforcement layers used in a pressure hose, improvements in pressure hoses having a braided reinforcement layer are still desired. For example, previously known pressure hoses have a limit as to their pressure tolerance, and high-pressure tolerances are desired. In some cases, higher pressure hoses can be produced, but at the cost of sacrificing, for example, weight and/or flexibility of the pressure hose. Improved hose efficiency and flex force is also desired.

One specific example of a deficiency in the design of some existing pressure hoses is where beams do not follow a consistent path. When beams do not follow consistent paths throughout the braid, the geometry variation creates stress concentrations and shifting mean braid diameters. This geometry variation results in products with inconsistent hydrostatic and impulse performance. These inconsistencies create significant risk in not meeting performance requirements.

Accordingly, a need continues to exist for a pressure hose including a braided reinforcement layer that improves on some or all of the problems identified above.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, a pressure hose is described wherein the pressure hose comprises a tube layer defining an inner passageway of the pressure hose, a reinforcement layer disposed over the tube layer, and a cover layer disposed over the reinforcement layer. The reinforcement layer is comprised of a plurality of beams braided around the tube layer. Each beam may be comprised of a plurality of ends. The reinforcement layer has a reinforcement volumetric ratio (RVR) of greater than or equal to 110%.

In some embodiments, a reinforcement layer for a pressure hose is described wherein the reinforcement layer comprises a plurality of beams braided together to form a hollow, cylindrical-shaped body. Each of the beams comprises a plurality of ends arranged in a multi-layer orientation. The multi-layered orientation ensures that the ends within the beam will not all have the same overall length. An identical multi-layered end orientation may be used in all of the beams braided together to form the reinforcement layer. The use of an identical multi-layered end orientation for all beams helps to ensure that all beams used in the reinforcement layer have the same overall length.

In some embodiments, a pressure hose is described wherein the pressure hose comprises a tube layer defining an interior passageway of the pressure hose, a reinforcement layer disposed over the tube layer, and a cover layer disposed over the reinforcement layer. The reinforcement layer comprises a plurality of beams braided together around the tube layer, with each of the beams comprising a plurality of ends grouped together in a multi-layered orientation. Each of the plurality of beams includes an identical number of ends arranged in an identical multi-layered end orientation. The reinforcement layer formed in this manner has a reinforcement volumetric ratio of greater than or equal to 110%.

In some embodiments, a pressure hose is described wherein the pressure hose comprises a single layer reinforcement layer, the single layer reinforcement layer having the beam and end configuration described above and a reinforcement volumetric ratio of greater than 126%.

In some embodiments, a pressure hose is described wherein the pressure hose comprises a double layer reinforcement layer, each layer having the beam and end configuration described above. Furthermore, each layer of the reinforcement layer is configured to have a net negative length change when pressure is applied to the pressure hose. In some embodiments, the net negative length change feature is achieved by using a braid angle in each layer less than the neutral angle of the pressure hose.

These and other aspects of the pressure hose described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed bearing isolator, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
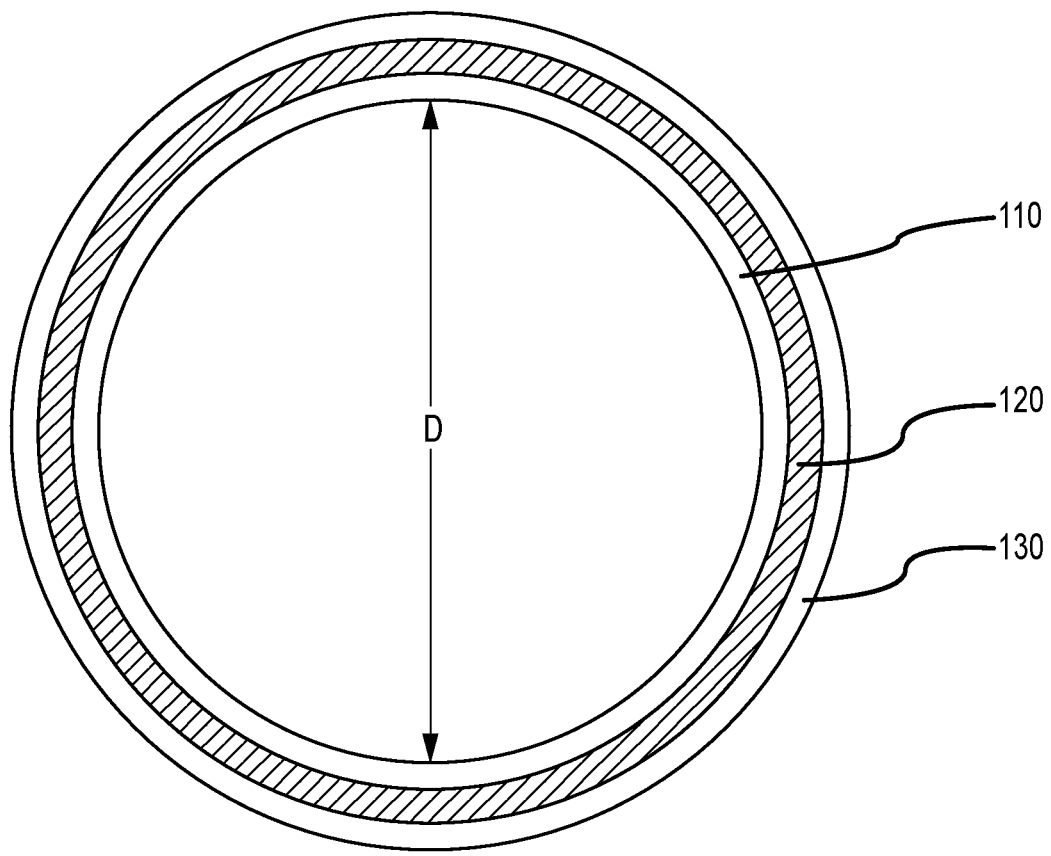
FIG. 1 is a cross-section view of the basic composite structure of a pressure hose according to various embodiments described herein.

FIG. 1 provides a cross-sectional view of a pressure hose 100 according to various embodiments described herein. The basic structure of the pressure hose 100 comprises a tube layer 110, a reinforcement layer 120, and a cover layer 130. The tube layer 110 serves as the inner most layer of the pressure hose 100, the reinforcement layer 120 serves as an intermediate layer, and the cover layer serves 130 as the outer most layer, such that the tube layer 110 and cover layer 130 effectively encapsulate the reinforcement layer 120. As shown in FIG. 1, the tube layer 110, reinforcement layer 120, and cover layer 130 are concentrically aligned with each other.

The tube layer 110 has an elongated, hollow, cylindrical shape. As the inner most layer of the pressure hose 100, the tube layer 110 defines an interior passage of the pressure hose 100 through which media may flow. The inner diameter D of the tube layer 110 (i.e., the diameter of the passage of the pressure hose 100), the outer diameter of the tube layer 110, and the thickness of the tube layer (i.e., the distance between the inner diameter D and the outer diameter of the tube layer) are generally not limited, and may be selected based on the specific application for which the pressure hose will be used. In some embodiments, the inner diameter D of the tube layer 110 may be in the range of from 3 mm to 127 mm, such as from 6 mm to 51 mm. The thickness of the tube layer 110 may be in the range of from 1.25 mm to 13 mm, such as from 2 mm to 5 mm. In some embodiments, the tube layer 110 thickness can be less than the thickness used in previously known tube layers for pressure hoses, since the tube layer 110 of the hose 100 described herein need not be relied upon for reinforcement to the extent that was required in previously known pressure hoses. As described in greater detail below, the tube layer 110 may not need to provide reinforcement to the hose 100 because the reinforcement layer 120 described herein exhibits such drastically improved reinforcement characteristics.

The material of the tube layer 110 is also generally not limited, and may be any material suitable for a pressure hose and/or suitable for handling a specific media that will be passed through the pressure hose 100. General classes of material that are suitable for use as the material of the tube layer include rubber and plastic. Specific examples of rubber material that is suitable for use include natural rubber, nitrile rubber (NBR), styrene-butadiene rubber (SBR), chloroprene (CR), ethylene propylene diene monomer (EPDM), and chlorinated polyethylene (CPE). Specific examples of plastic material that is suitable for use include polyamide (PA or Nylon), polyethylene terephthalate (PET), polytetrafluoroethylene (PTFE), and UHMWPE (ultra-high molecular weight polyethylene (UHMWPE). Other general classes of material that can be used for the tube layer include thin metals layers, flexible metal structures, thermoplastic vulcanizates (TPV), and other elastomers such as thermoplastic and thermoset polyurethane, polyurea, and polyimide.

In some embodiments, the tube layer 110 is a composite material, such as a tube layer made of multiple co-axially aligned layers of different material. Such a composite structure may include any number of layers and may include any of the materials described previously in combination and in any order. For example, the composite material may include one or more layers of plastic material, one or more layers of rubber material, and one or more layers of polymer material. The order of the various layers can be, for example, plastic inner most layers, rubber intermediate layers, and polymer outer layers, though other ordering of layers are all possible.

In some embodiments, the material of the tube layer 110 is made from a material that traditionally would not have been deemed suitable for use as a tube layer in a pressure hose for various reasons. For example, in some embodiments, the tube layer material may be a low performance material, such as tube layer material typically used in low pressure hoses. The use of a lower performance tube layer material may be possible because of the performance characteristic of the reinforcement layer 120 described in greater detail below. In other words, a lower performance tube layer material may be suitable for use in the hose 100 described herein because the tube layer does not need to be relied upon for reinforcement in view of the enhanced reinforcement properties provided by the reinforcement layer 120 described herein. An exemplary low performance material that can be used for the tube layer 110 of the hose 100 described herein, but which was previously not deemed suitable for pressure hoses, is a clay material, such as a clay material tube layer commonly used in low-pressure hoses.

Alternatively, the material of the tube layer 110 may be made from a premium, high performance tube layer material. The use of such premium materials may extend the performance of the pressure hose 100 by combining the characteristics of the high-performance tube layer material with the characteristics of the reinforcement layer 120 described herein. This combination may provide a hose 100 having performance capabilities greater than what has previously been accomplished with a high-performance tube layer material and previous known reinforcement layers.

In some embodiments, such as when the material of the tube layer 110 is rubber, the material of the tube layer 110 is free of substantially free of "white" filler. Generally speaking, rubber material can be filled with "black" filler and/or "white" filler. Black filler refers to fillers that provide structure and enhancement to the rubber's physical properties. An exemplary black filler is carbon black. White filler refers to fillers that are used to balance chemical reactions in the thermoset process and/or to increase volume. Exemplary white fillers include clay and talc. The material used for the tube layer 110 can include black filler in any suitable amount. However, in some embodiments, the material of the tube layer is free of white fillers or substantially free of white fillers. As used herein with respect to the amount of white filler, substantially free means less than 5 wt % of the tube layer.

In alternate embodiments, the tube layer 110 may include a higher amount of filler, whether "black" filler, "white" filler, or both, than what has traditionally been provided in a tube layer used in a pressure hose. The use of more filler in the tube layer 110 may be possible by virtue of the reduced dependence on the tube layer for reinforcement in view of the improved reinforcement layer 120 described in greater detail below. A primary advantage of using a tube layer 110 with increased filler content is that the cost of the tube layer will generally be less than a lower filler content tube layer, and therefore the overall cost of the hose 100 is reduced, yet without sacrificing performance characteristics of the hose 100.

The internal and/or external surface of the tube layer 110 can optionally be treated and/or coated in order to impart the internal and/or external surfaces with various desired properties. For example, the internal surface may be treated or coated in order to impart the tube layer 110 with chemical resistance of chemical compatibility. The external surface may be treated or coated to make the tube layer 110 better suited for the subsequent application of the reinforcement layer 120, such as in order to improve adhesion between the tube layer 110 and the reinforcement layer 120. Exemplary treatments for the internal and/or external surface can include, but are not limited to, the application of a chemical primer, the application of a rubber layer of varying composition, and the application of a treated fabric layer.

While FIG. 1 illustrates a pressure hose 100 including a single tube layer 110, it should be appreciated that the pressure hose may include more than one tube layer 110. In other words, the tube layer 110 can be a composite structure made of two or more concentrically aligned layers. Each layer of a multiple layer tube layer 110 can be made of the same material, the same base material but with different filler contents, surface treatments, etc., or different layers of a multiple layer tube layer 110 can be made from different materials, such as by providing one or more plastic-based layers and one or more rubber based layers. A multi-layered tube layer 110 can be used to provide various characteristics to the tube layer that may be desirable based on a specific intended application for the pressure hose 100, such as improved strength, improved chemical compatibility, improved chemical resistance, etc.

With continuing reference to FIG. 1, applied over the tube layer 110 is a reinforcement layer 120. The reinforcement layer 120 can be formed directly on the tube layer 110, i.e., without any intermediate material(s) or layer(s) between the tube layer 110 and the reinforcement layer 120. Alternatively, intermediate material(s) or layer(s) can be provided between the tube layer 110 and the reinforcement layer, such as a layer or material that promotes adhesion of the reinforcement layer 120 to the tube layer 110. Where no intermediate layer is provided between the reinforcement layer 120 and the tube layer 110, the reinforcement layer 120 will generally have an internal diameter approximately equal to the outer diameter of the tube layer 110. The thickness of the reinforcement layer is generally not limited and, as discussed in greater detail below, will vary based on the specific construction of the reinforcement layer, such as the number of ends per beam, the orientation of the ends within a beam, and the number of layers within the reinforcement layer. The reinforcement layer 120 will generally be coextensive with the tube layer 110, meaning the length of the reinforcement layer 120 will generally be approximately equal to the length of the tube layer 110, such that the reinforcement layer 110 is provided along the entire length of the tube layer 110.

Figure 2:
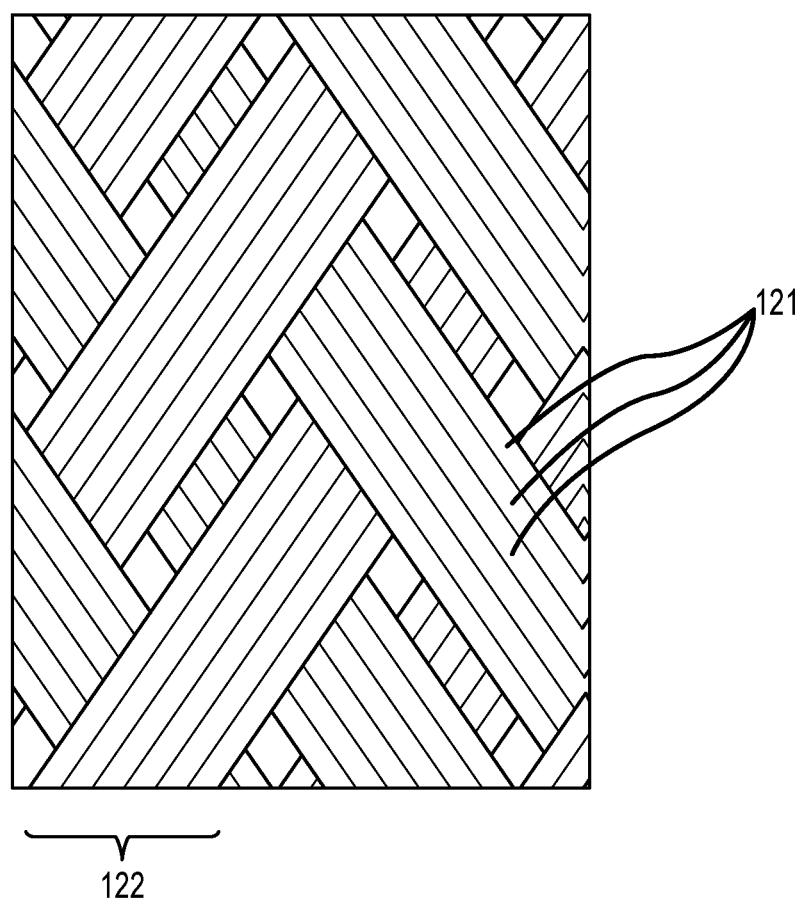
FIG. 2 is a top view of a braided reinforcement layer according to various embodiments described herein.

With reference to FIG. 2, the reinforcement layer generally comprises one or more layers, with each layer comprising a plurality of ends 121 bundled together to form individual beams 122, and a plurality of beams 122 being braided over the tube layer 110 to form a layer of the reinforcement layer 120. Generally speaking, an even number of beams 122 are used in forming a layer of the braided reinforcement layer 120, with half of the beams being a clockwise helix and the other half of the beams being a counterclockwise helix. The counterclockwise beams and the clockwise beams pair off to form an even number of helices that is equal to half the total number of beams used in a layer of the reinforcement layer 120.

The ends 121, which are also referred to in the art as strands, are generally in the shape of elongated cylindrical bodies, such as in the form of wires. The ends 121 are continuous ends that run the entire length of the hose 110 on which they are braided. The diameter of the ends 121 is generally not limited and can be any diameter suitable for use in a braided pressure hose. In some embodiments, the diameter of the ends 121 is in the range of from 0.2 mm to 0.5 mm, such as from 0.25 mm to 0.33 mm. As discussed in greater detail below, in some embodiments all of the ends 121 in a layer of the reinforcement layer 120 have an identical diameter, while in other embodiments, the diameter of the ends 121 used in a layer of the reinforcement layer 120 is non-uniform.

The material of the ends 121 is generally not limited and can be any material suitable for ends used in a braided pressure hose. General classes of material that are suitable for use as the material of the ends 121 include metal, textiles, and plastic. Specific examples of metal material that is suitable for use include brass coated steel, galvanized steel, and stainless steel. Specific examples of textile material that is suitable for use include Rayon and Aramid (para and meta). Specific examples of plastic material that is suitable for use include polyester and nylon yarns. Other general classes of material that can be used for the ends 121 include tensile bearing fibers and filaments.

Other material that may be suitable for ends 121 includes ceramic fibers, polymer fibers, amorphous or crystalline fibers (e.g., glass fiber), and carbon fibers. In some embodiments, carbon fiber is specifically useful as a material for the ends 121.

Ends 121 having a composite structure can also be used. The specific composite structure for the end 121 is not limited and can include, for example, a multi-layered composite structure or a matrix composite structure. When a composite structure is used, different materials can be used as part of the same end, such as in a multi-layered composite structure, wherein an inner core can be a first material, followed by one or more coaxially aligned layers of different materials over the inner core. Any of the end materials discussed above can be used in any combination and with any suitable composite structure.

In some embodiments, the ends 121 may further include a coating or cladding layer. Such a coating or cladding can be provided on some or all of the ends 121. Coatings and/or claddings can be used to provide a variety of different characteristics to the ends 121. For example, anti-corrosion or anti-stress coatings can be provided on the ends. In one example, an anti-stress coating, such as a plastic coating, can be provided on a carbon fiber end 121. Carbon fiber is generally strong in its axial direction, but weaker in a direction transverse to the longitudinal axis, and a plastic coating on a carbon fiber end can help to reinforce the end in its transverse direction.

The ends 121 used in a layer of the reinforcement layer 120 all have a tensile strength. In some embodiments, the material used for the ends 121 is an ultra-high tensile strength wire material. The term "ultra-high tensile strength" as used herein means having a tensile strength in the range of from 3,050 to 3,350 MPa. Material having a lower tensile strength than ultra-high tensile strength wire material can also be used, such as steel wire having a tensile strength as low as 2,150 MPa, or textile materials that will have an even lower tensile strength. In some embodiments, all of the ends 121 used in the reinforcement layer 120 are made from material having the same tensile strength (whether high tensile strength or otherwise). In alternate embodiments, and as discussed in greater detail below, the ends 121 used in a layer of the reinforcement layer 120 may have different tensile strengths.

With continued reference to FIG. 2, groups of individual ends 121 are provided in the form of beams 122. The number of ends 121 per beam 122 is generally not limited. In some embodiments, the number of ends 121 per beam 122 is in the range of 2 or more to upwards of 100,000 or more. In some embodiments, the number of ends 121 per beam 122 is in the range of from 10 to 16. The number of ends 121 per beam 122 can vary within each beam 122 used in the reinforcement layer 120, though in some preferred embodiments, and as discussed in greater detail below, the number of ends 121 per beam 122 is uniform across all beams 122 used in a layer of the reinforcement layer 120.

The ends 121 in each beam 122 may be made of the same material, or different end materials can be provided within a beam. For example, in some embodiments a beam 122 will include a plurality of ends 121, some of which are made form a first material and some of which are made from a second material different from the first material. Any combination of end materials can be used within a beam 122, including two different end materials, three different end materials, or more. In one non-limiting example, a beam 122 includes ends 121 made from steel wire and ends 121 made from carbon fiber.

Figure 3A:
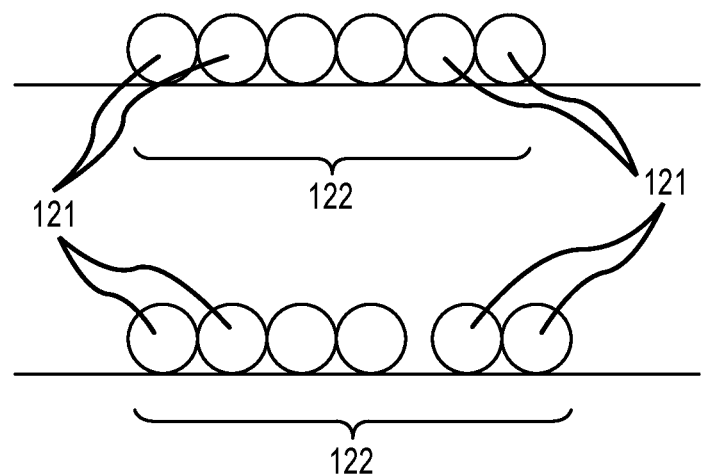
FIG. 3A provides cross-sectional views of end orientations according to the prior art.
Figure 3B:
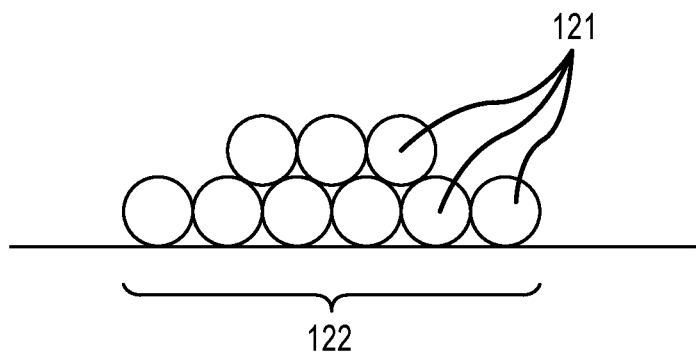
FIGS. 3B-3E provide cross-sectional views of various end orientations suitable for use within a beam according to various embodiments described herein.
Figure 3C:
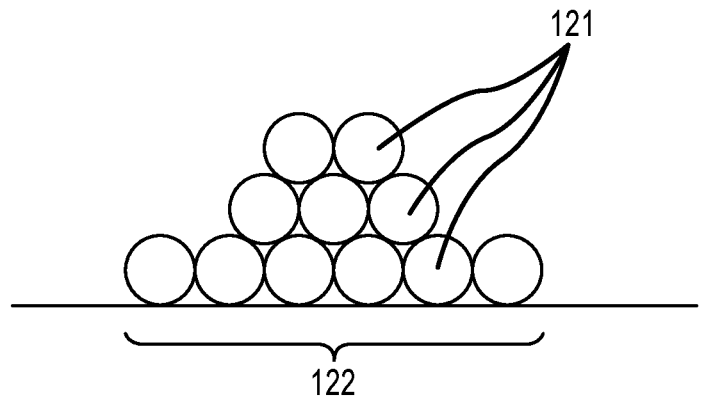
Figure 3D:
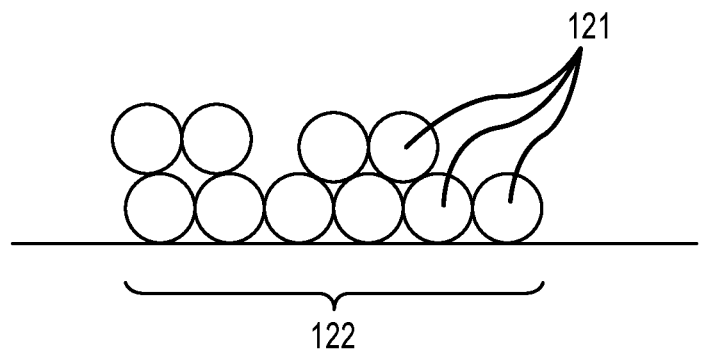
Figure 3E:
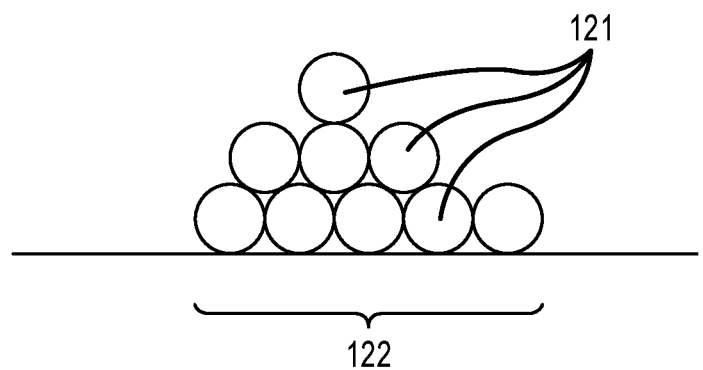

The manner in which the ends 121 are layered and oriented when bundled together in a beam 122 is generally not limited. In some previously known end orientations, such as the end orientations shown in FIG. 3A, all ends 121 are aligned side by side in a single layer, potentially with a gap between one or more neighboring ends 121. However, in some preferred embodiments of the reinforcement layer 120 described herein, the ends 121 are bundled together in beams 122 in a multiple (two or more) layer orientation. FIGS. 3B-3E illustrate various multiple layer orientations that can be used for the beams 122. For example, in FIG. 3B, the end 121 orientation within a beam 122 includes a first layer of six side by side ends 121, on top of which is provided a second layer of three side by side ends 121, generally centered on the first layer. In FIG. 3C, a three-layer end orientation is shown, including a first layer of six side by side ends 121, on top of which is provided a second layer of three side by side ends 121, on top of which is provided a third layer of two side by side ends 121. In FIG. 3D, a two-layer end orientation is shown wherein the second layer of ends includes a gap between one or more neighboring ends 121 in the second layer. FIG. 3E shows an end orientation similar to the end orientation of FIG. 3C, but with a different number of ends 121 in the first and third layer. The end orientations shown in FIGS. 3C and 3E reaffirm that any number of ends can be provided in any number of layers to create any number of different geometries.

As shown in FIGS. 3B-3E, all of the ends 121 have a circular cross-section. However, it should be appreciated that the ends can have other cross-sectional shapes. Other end cross-sections suitable for use in the embodiments described herein include oval, triangle, square, rectangle, diamond, hexagon, and others. The cross-sectional shape of the ends 121 within a beam 122 may be uniform, or a beam 122 may include ends with multiple different cross-sectional shapes, such as a beam 122 having ends with a circular shape, ends with an oval shape, and ends with a diamond shape. Any combination of cross-sectional end shapes can be used.

The mixing of ends with different sizes and shapes and in different arrangements provides the ability to optimize the surface area to volume ratio of the 'superpack' braiding. The typical low energy configuration of a circular cross-section is a hexagonal close pack arrangement, which is limited by the ability to stack circular cross-sectional areas together to minimize the amount of free space between the constituents. By introducing a distribution of end diameter sizes, shapes, and arrangements, it is possible to allow for more reinforcement material within the same braiding volume. Further, by changing the cross-section shape to hexagonal or other shapes, more reinforcement material can be located within the same volume.

When the ends 121 are provided in a multi-layered orientation, such as shown in each of FIGS. 3B-3E, this ensures that some of the ends 121 in a reinforcement layer 120 have a longer overall length than other ends 121 in the reinforcement layer 120. For example, ends that are in an upper layer of a stack of ends in a beam will be longer in total distance than ends in a lower layer of the same stack since the ends in the upper layer travel along a larger diameter helical path as they wind around the tube layer 110 than stands in the lower layer that travel along a smaller diameter helical path.

In some embodiments, the ends 121 within a beam 122 are aligned in a straight-line path with respect to one another along the length of the beam 122. Alternatively, the ends 121 within a beam 122 can be provided in a twist configuration wherein all ends 121 within a beam 122 are twisted in a clockwise or counterclockwise direction along the length of the beam 122, such that each end follows a helical path along the length of the beam 122. This helical path is separate and independent of the helical path the beam 122 may travel once it is braided around the tube layer 110 as part of forming the reinforcement layer 120.

The end 121 orientation within each beam 122 can be different from beam to beam or between groups of beams.

However, in some preferred embodiments, and as discussed in greater below, the end 121 orientation is identical within all beams 122 used in a layer of a reinforcement layer 120. When the end orientation is uniform across all beams 122 in a layer of the reinforcement layer 120, this ensures that every beam 122 has the same length across the length of the reinforcement layer.

Beams 122 form a layer of the reinforcement layer 120 by virtue of being braided over the tube layer 110. Any braiding pattern can be used to form a layer of the reinforcement layer 120 over tube layer 110. In some embodiments, a 2×2 braid is used, wherein each beam 122 repeats a pattern of going under two transverse beams then over two transverse beams. A 3×3 braid pattern can also be used. As known to those of ordinary skill in the art, braiding machinery can be used to carry out the braiding of the beams 122 over the tube layer 110 to form a layer of the reinforcement layer. Generally speaking, braiding machinery will include a carrier for each beam 122 included in the reinforcement layer 120. In this manner, the number of helices in a reinforcement layer can be determined via equation (1):

$$n_{helix} = n_{carriers} \div 2 \qquad (1)$$

In some embodiments, the reinforcement layer 120 used in the pressure hose 100 described herein has a reinforcement volumetric ratio (RVR) of greater than or equal to 110%. If the reinforcement layer 120 has a single layer configuration, the RVR of the reinforcement layer 120 is the same as the RVR of the single layer of the reinforcement layer. If the reinforcement layer 120 includes two or more layers, then an RVR value is calculated for each individual layer of the reinforcement layer 120 based on each individual layer's specific composition and mean helix diameter. Reinforcement volumetric ratio (RVR) is calculated via equation (2):

$$RVR = \frac{n_{helix} \times CSL \times n_{ends}}{\pi \times \Phi} \qquad (2)$$

where $n_{ends}$ is the number of ends in a helix, $\Phi$ is the Mean Helix Diameter, and Cylindrical Segment Length (CSL) is calculated via equation (3)

$$CSL = \frac{End\ Diameter}{\cos \theta} \qquad (3)$$

where End Diameter is the diameter of the end and $\theta$ is the braid angle.

Figure 4A:
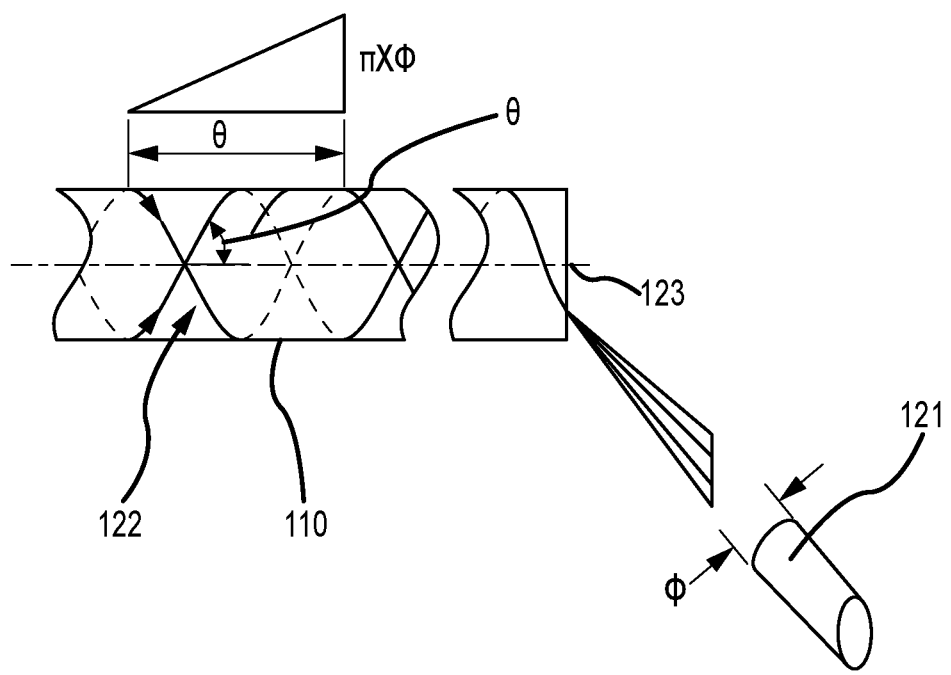
FIG. 4A provides a simplified side view of a braided reinforcement layer and a simplified expanded perspective view of the ends of a helix of the braided reinforcement layer for purposes of illustrating dimensions of the braided reinforcement layer described herein.
Figure 4B:
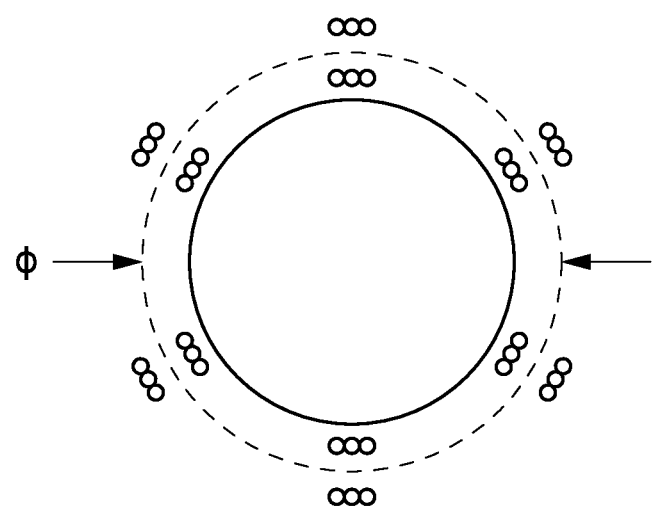
FIG. 4B provides a simplified cross-sectional view of a reinforcement layer braided over a tube layer for purposes of illustrating dimensions of the braided reinforcement layer described herein.

FIGS. 4A and 4B provide illustrations of various dimensions used in the above calculations. In FIG. 4A, a simplified side view of a beam 122 braided around tube layer 110 in a helical path is shown. A center line longitudinal axis 123 is illustrated in FIG. 4A, and braid angle $\theta$ is shown as the angle between the beam 122 and the center line longitudinal axis 123 at their intersection point. FIG. 4A also provides an expanded perspective view of an end 121 of beam 122 oriented at the braid angle $\theta$. The Cylindrical Segment Length is the length of the major axis of the ellipse formed when a vertical cross-section is taken through the end 121 oriented at the braid angle $\theta$, and as discussed above, can be calculated by dividing the end diameter d by the cosine of the braid angle $\theta$. FIG. 4B illustrates Mean Helix Diameter, which is the diameter of the helix as measured where beams 122 of the helices cross.

Figure 5A:
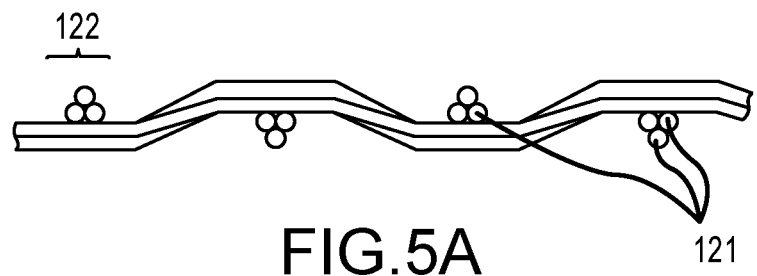
FIGS. 5A and 5B illustrate a cross-sectional view of a end and beam orientation according to various embodiments described herein.
Figure 5B:
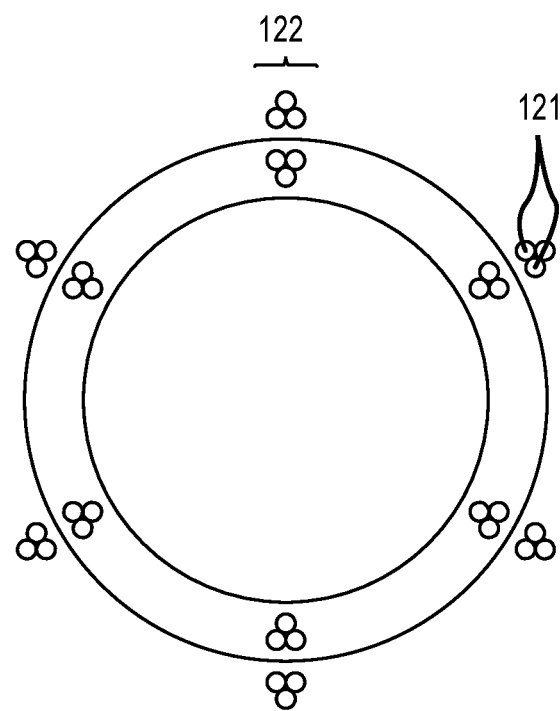

An RVR of greater than or equal to 110% is provided when a "superpack" end and beam orientation as illustrated in FIGS. 5A and 5B is provided. This "superpack" design is specifically achieved by providing a layered end orientation within each beam such that not all ends within a beam have the same overall lengths (i.e., ends in an outer layer have longer overall length than ends in an inner layer due to larger helical diameter path traveled by outer layer ends) in combination with providing a reinforcement layer where all beams are identical with respect to the end orientation within each beam such that the overall length of all beams in the reinforcement layer is identical. FIGS. 5A and 5B illustrate simplified cross-sectional views of a reinforcement layer having this configuration wherein each beam 122 includes a layered end orientation to provide ends having variable overall end length, and all beams 122 in the reinforcement layer have the same end orientation (in this case, a layer having one end and a layer having two ends) to provide the uniform overall beam length.

Figure 6A:
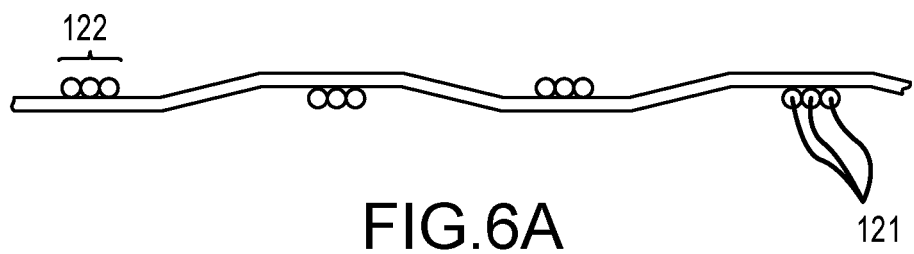
FIGS. 6A, 6B, 7A and 7B illustrate cross-sectional views of various end and beam orientations according to the prior art.
Figure 6B:
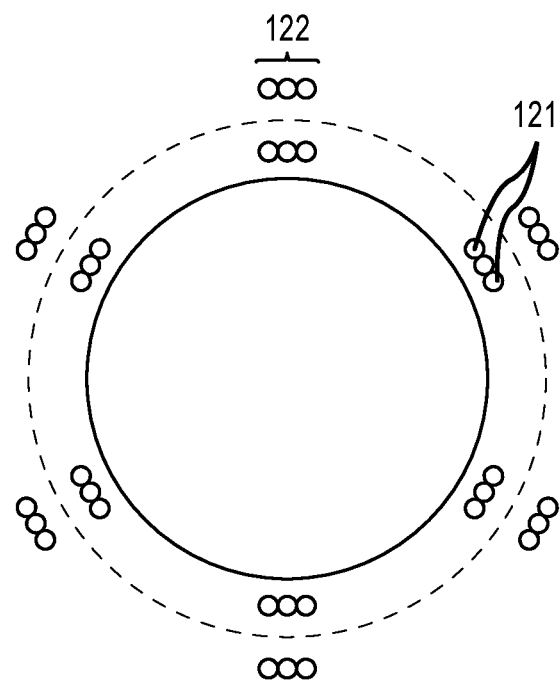

The "superpack" end and beam orientation of FIGS. 5A and 5B is contrasted with a conventional end and beam orientation as shown in FIGS. 6A and 6B. In the conventional design, the ends 121 all lie flat in a single layer within each beam 122, thereby providing ends 121 all having an identical overall end length. Furthermore, all beams 122 have this single layer flat end orientation, thereby providing beams 122 all having an identical overall beam length. The conventional end and beam orientation shown in FIGS. 6A and 6B provides an RVR of less than or equal to 99%.

Figure 7A:
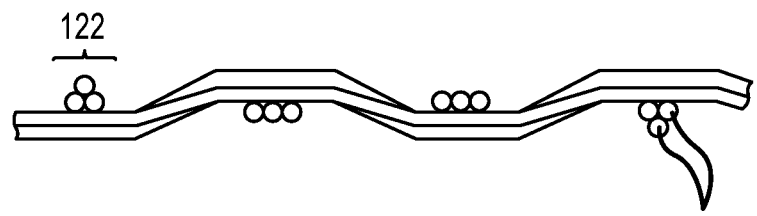
Figure 7B:
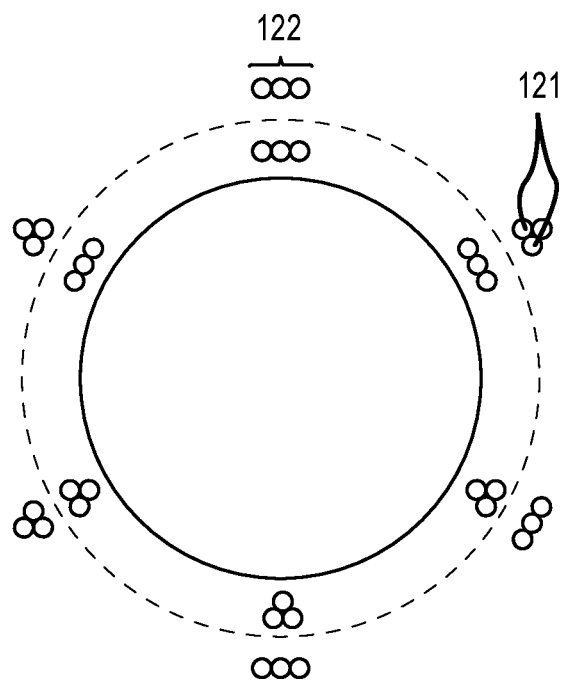

The "superpack" end and beam orientation of FIGS. 5A and 5B is also contrasted with a "dead zone" end and beam orientation as shown in FIGS. 7A and 7B. In the "dead zone" design, the ends 121 within a beam 122 either lie flat in a single layer or have a layered end orientation. This means not all ends 121 have the same overall end length because at least some of the beams 122 have the layered end orientation that results in differing overall end lengths. Furthermore, the beams 122 have differing overall beam lengths because of the different end orientations (single layer or layered) used amongst the beams 122. The "dead zone" end and beam orientation shown in FIGS. 7A and 7B provides an RVR of greater than 99% but less than 110%.

As noted above, the reinforcement layer 120 of the pressure hose 100 described herein has an RVR of greater than or equal to 110%, and this RVR value is obtained by using the "superpack" end and beam orientations illustrated in FIGS. 5A and 5B. While the preferred "superpack" design requires identical beams, the specific end orientation used within each beam is generally not limited, provided a layered end orientation is used. FIGS. 3B-3E provide examples of layered end orientations that can be used in a "superpack" design.

Figure 8A:
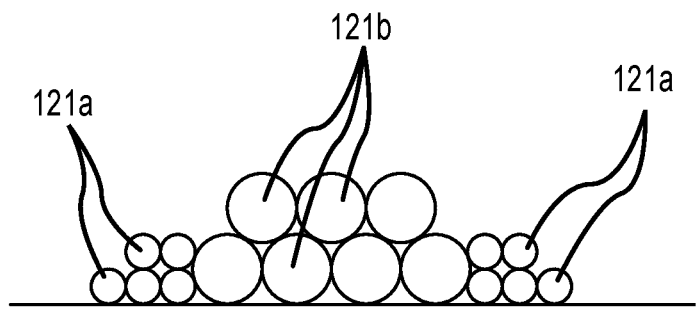
FIGS. 8A and 8B illustrate cross-sectional views of various end orientations having varying end diameters according to various embodiments described herein.
Figure 8B:
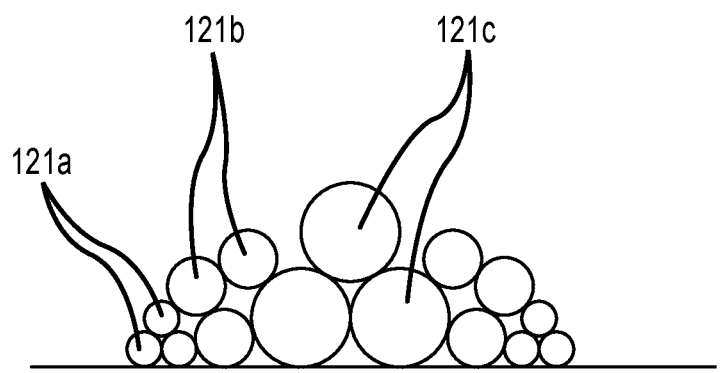

In addition to the number of layers and the number of ends per layer, other characteristic of the end orientation within a beam that can be varied include the diameter of the ends in the beam and the tensile strength of the ends within a beam. With reference to FIGS. 8A and 8B, a multi-layered end orientation suitable for use in a "superpack" design illustrates how the diameter of the ends 121 may vary within the beam 122. Specifically, FIG. 8A illustrates ends 121a at either side of the beam 122 having a smaller diameter than the diameter of the ends 121b at the middle portion of the beam 122, while FIG. 8B illustrates ends 121a, 121b, and 121c that have progressively larger diameters from the sides of the beam 122 towards the middle of the beam 122. While not shown, other variations in end diameter within a beam can also be used, such larger diameter ends at the sides of the beam and smaller diameter beams at the middle of the beam, small diameter ends in a lower layer with larger diameter ends in an upper layer, large diameter ends in a lower layer with smaller diameter ends in an upper layer, and a random selection of large and small diameter ends throughout the end orientation of a beam.

Figure 9A:
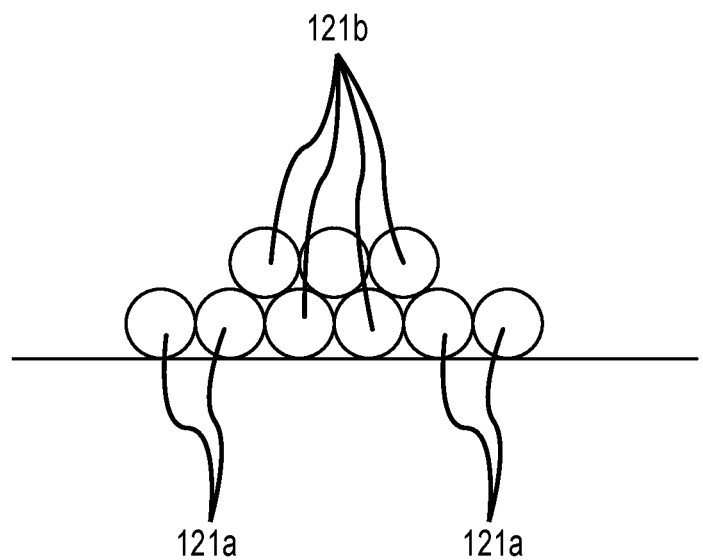
FIGS. 9A and 9B illustrate cross-sectional views of the various end orientations having varying tensile strength ends according to various embodiments described herein.
Figure 9B:
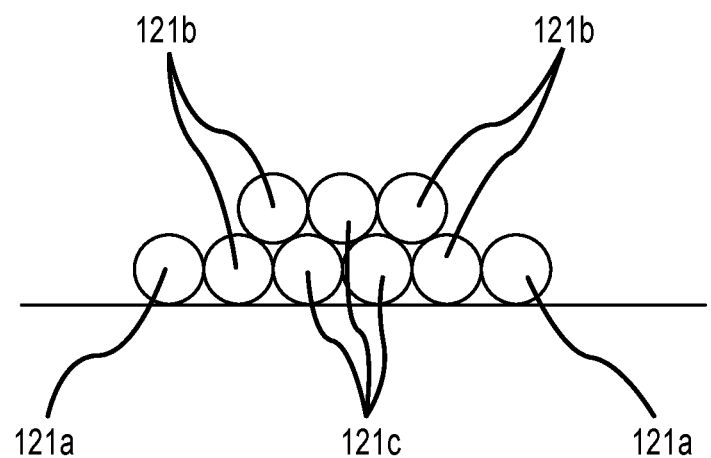

With reference to FIGS. 9A and 9B, a multi-layered end orientation suitable for use in a "superpack" design illustrates how the tensile strength of the ends 121 may vary within the beam 122. Specifically, FIG. 9A illustrates ends 121a at either side of the beam 122 having a lower tensile strength than the tensile strength of the ends 121b at the middle portion of the beam 122, while FIG. 9B illustrates ends 121a, 121b, and 121c that have progressively higher tensile strengths from the sides of the beam 122 towards the middle of the beam 122. While not shown, other variations in end tensile strength within a beam can also be used, such higher tensile strength ends at the sides of the beam and lower tensile strength beams at the middle of the beam, lower tensile strength ends in a lower layer with higher tensile strength ends in a upper layer, higher tensile strength ends in a lower layer with lower tensile strength ends in an upper layer, and a random selection of varying tensile strength ends throughout the end orientation of a beam.

Any combination of the variable diameter ends and variable tensile strength ends discussed above can also be used. For example, an end orientation may have smaller diameter ends with a lower tensile strength at the sides of the beam and larger diameter ends with a higher tensile strength at the middle of the beam.

Referring back to FIG. 1, the pressure hose 100 is shown having a single layer reinforcement layer 120. However, it should be noted that the pressure hose 100 may include a reinforcement layer 120 comprised of multiple layers. In some embodiments, two or three layers make up reinforcement layer 120, one on top of the other, but more than three reinforcement layers is also possible. When multiple layers are used for reinforcement layer 120, the individual layers are designed with specific mechanical compliance to interact in a fashion which optimizes loading. As a result, friction is normal for materials where biaxial stress strongly affects tensile strength (e.g., steel wire).

When multi-layer reinforcement layer is provided, a polymeric friction layer may be provided as an intermediate layer between adjacent layers of the reinforcement layer, though such a polymeric friction layer is not required. The material of the polymeric friction layer, if used, can be similar or identical to the materials used for the tube layer 110 or cover layer 130 as described herein, and the thickness of the polymeric friction layer can be in the range of 0.1 mm to 2.5 mm.

In some embodiments, each of the layers of a multi-layer reinforcement layers 120 of the pressure hose uses a "superpack" design to ensure the RVR of each individual layer is greater than 110%. An RVR value can be calculated for each layer using the same methods described previously, and the RVR of the reinforcement layer comprising multiple layers can be the average of the RVR values of each layer making up the reinforcement layer. When an average RVR value is used for the multi-layer reinforcement layer, it is possible for a single layer to have an RVR value less than 110% while still providing a multi-layer reinforcement layer having an RVR greater than 110% (and therefore qualifying as having a "superpack design").

In a particular embodiment of the pressure hose disclosed herein, the reinforcement layer 120 of the hose 100 has the specific features of a single layer reinforcement layer 120 wherein the RVR of the reinforcement layer 120 is greater than 126%. This specific design provides performances characteristics that meet or exceed those of previously known pressure hoses by, for example, providing more braid material within a similar volume.

As noted above, the reinforcement layer 120 is made of single layer of beams braided in clockwise and counter-clockwise helices around a tube layer 110. The single layer structure can simplify manufacturing and reduce the overall size of the pressure hose, as well as reduce material costs and eliminate complications that can arise from the interaction between multiple layers of a reinforcement layer. However, because of the greater than 126% RVR value of the single layer reinforcement layer, the performance of the hose is not diminished despite its simplified design.

In the specific embodiment discussed above, the RVR of the single-layer reinforcement layer 120 is greater than 126%, and more preferably greater than 133%. The RVR upper limit of the single-layer reinforcement layer is generally not limited, but in some embodiments, may be in the range of about 160%.

In some embodiments, the RVR range of greater than 126% can generally be accomplished by providing more braiding material in similar volume to previously known hoses. While a number of variables can be adjusted to create a single layer reinforcement layer with a RVR of greater than 126%, in some embodiments, an increase of the number of ends in the beams that make up the reinforcement layer and/or an increase in the diameter of the ends is what primarily contributes to the increased RVR value. As seen in Equations 2 and 3 provided previously, both the number of ends and the diameter of the ends are values appearing in the numerator of the equations, thus showing how an increase in either or both of these values increases the RVR value. In some embodiments, the number of ends is greater than 12, and more preferably greater than or equal to 14. In some embodiments, the diameter of the ends is in the range of from 0.25 mm to 0.33 mm.

In another particular embodiment of the pressure hose disclosed herein, the reinforcement layer 120 of the hose 100 has the specific features of a two-layer reinforcement layer 120 wherein both layers have a net negative length change. Net negative length change refers to the way in which the length of a layer gets smaller when the hose is under pressure, and thus in this specific embodiment, both layers of the reinforcement layer are configured such that when the hose in under pressure, the overall length of the layers decrease.

Whether a layer of the reinforcement layer 120 experiences net negative length change or net positive length change under pressure is determined by the braid angle θ of the beams used in the layer, and specifically whether the braid angle θ is greater than or less than the neutral angle for the hose. With respect to pressure hoses as described herein, the neutral angle is 54° 44', and braid angles θ less than 54° 44' result in the length of the layer decreasing under pressure (with corresponding increase in the diameter of the layer), while braid angles θ greater than 54° 44' result in the length of the layer increasing under pressure (with corresponding decrease in the diameter of the layer). Thus, for the specific embodiment described herein, both layers of reinforcement layer 120 have a braid angle θ of less than 54° 44' in order to ensure net negative length change under pressure in both layers.

While the braid angle θ for both layers of the reinforcement layer is less than 54° 44', the braid angle θ of the inner layer is less than the braid angle θ of the outer angle. In some embodiments, the relationship between the braid angle θ of the inner layer and the braid angle of the outer layer θ is such that the braid angle θ of the inner layer is about 94% of the braid angle θ of the outer layer. In some embodiments, the braid angle θ of the inner layer is in the range of from about 49° to about 53°, while the braid angle θ of the outer layer is from about 52° to about 54° 44'. In one exemplary, though non-limiting, example, the braid angle θ of the inner layer is about 50° and the braid angle θ of the outer layer is about 54°.

Referring back to FIG. 1, the pressure hose 100 comprises a cover layer 130 applied over the reinforcement layer 120. The cover layer 130 can be formed directly on the reinforcement layer 120, i.e., without any intermediate material(s) or layer(s) between the reinforcement layer 120 and the cover layer 130. Alternatively, intermediate material(s) or layer(s) can be provided between the reinforcement layer 120 and the cover layer 130, such as a layer or material that promotes adhesion of the cover layer 130 to the reinforcement layer 120.

The inner diameter of the cover layer 130, the outer diameter of the cover layer 130, and the thickness of the cover layer 130 (i.e., the distance between the inner diameter and the outer diameter of the cover layer) are generally not limited, and may be selected based on the specific application for which the pressure hose will be used. Where no intermediate layer is provided between the reinforcement layer 120 and the cover layer 130, the cover layer 130 will generally have an internal diameter approximately equal to the outer diameter of the reinforcement layer 120. In some embodiments, the inner diameter of the cover layer 130 may be in the range of from 6 mm to 153 mm, such as from 13 mm to 25 mm. The thickness of the cover layer 130 may be in the range of from 0.125 mm to 6 mm, such as from 0.75 mm to 2 mm.

The material of the cover layer 130 is also generally not limited, and may be any material suitable for an exterior cover layer of a pressure hose. General classes of material that are suitable for use as the material of the cover layer include rubber, nylon, and plastic. Specific examples of rubber material that is suitable for use include natural rubber, nitrile rubber (NBR), styrene-butadiene rubber (SBR), nitrile vinyl blends (e.g., NBR/PVC), chlorinated polyethylene (CPE), and chlorinated sulfonated polyethylene (CSM). Specific examples of plastic material that is suitable for use include polyurethane (PU), polyamide (PA), poly vinyl chloride (PVC), polyethylene terephthalate (PET), and poly propylene (PP). Other general classes of material that can be used for the cover layer 130 include elastomers such as TPV, thin metallic sheets, flexible metallic structures, and additional layers of braided fibers (e.g., glass, polymeric, or metallic).

In some embodiments, such as when the material of the cover layer 130 is rubber, the material of the cover layer 130 is free or substantially free of "white" filler. Generally speaking, rubber material can be filled with "black" filler and/or "white" filler. Black filler refers to fillers that provide structure and enhancement to the rubber's physical properties. An exemplary black filler is carbon black. White filler refers to fillers that are used to balance chemical reactions in the thermoset process and/or to increase volume. Exemplary white fillers include clay and talc. The material used for the cover layer 130 can include black filler in any suitable amount. However, in some embodiments, the material of the cover layer 130 is free of white fillers or substantially free of white fillers. As used herein with respect to the amount of white filler, substantially free means less than 5 wt % of the cover layer.

The internal and/or external surface of the cover layer 130 can optionally be treated and/or coated in order to impart the internal and/or external surfaces with various desired properties. For example, the internal surface may be treated or coated so that the cover layer 130 better adheres to the reinforcement layer 120. The external surface may be treated or coated to make the cover layer 130 more resistant and/or impervious to environment in which it is used. In some embodiments, the external surface of the cover layer 130 is provided with a veneer of rubber or plastic (e.g., a veneer of UHMWPE). In some embodiments, a mechanical treatment, such as helical indentations, is applied to the external surface to aid in bending.

While FIG. 1 illustrates a pressure hose 100 including a single cover layer 130, it should be appreciated that the pressure hose 100 may include more than one cover layer 130. In other words, the cover layer 130 can be a composite structure made of two or more concentrically aligned layers. Each layer of a multiple layer cover layer 130 can be made of the same material, the same base material but with different filler contents, surface treatments, etc., or different layers of a multiple layer cover layer 130 can be made from different materials, such as by providing one or more plastic-based layers and one or more rubber-based layers. A multi-layered cover layer 130 can be used to provide various characteristics to the cover layer that may be desirable based on a specific intended application for the pressure hose 100, such as improved strength, improved corrosion resistance to an external environment in which the hose is to be used, etc.

The use of the 'superpack' braiding configuration described herein allows for improvements to be achieved in the end terminations of the product. Before entering into customer applications, the ends of the product typically require the application of a coupling assembly to provide a seal against the environment to keep the pressurized media within the pressure hose contained. The coupling assembly also provides a mechanism for mounting into the customer system. The coupling assembly can be applied via a compression of the assembly to the hose product with the braid reinforcement providing a normalized response to the compression. With the 'superpack' construction described herein, it is possible to optimize the compression conditions of the coupling assembly to improve the functionality of the pressure seal to eliminate failures such as leakage of the media from the tube around the coupling, and others. The higher volumetric density of the 'superpack' braiding provides further improvements against any pressure-driven leakage out of the tube into the reinforcement and cover layers by creating a more tortuous path for any displaced media to travel to reach the environment.

The manner of manufacturing the hose described herein, including the manner of manufacturing the reinforcement layer, is generally not limited. In some embodiments, the pressure hose manufacturing begins with the inner tube, which may be formed without a mandrel by extrusion, or on flexible or rigid mandrels with extrusion, lamination, or wrapping. Because of the support provided by the reinforcement layer, thinner tube layers are possible. This, in turn, means that alternative tube materials may be coated on a mandrel or directly inside of an already formed reinforcement layer by extrusion, liquid coating, or less typical methods such as spraying powder coating.

Beams for the reinforcement layer may be purchased in pre-wound bobbins with the appropriate number of ends, or created using winding machines to use multiple supply spools to create bobbins of the appropriate configuration of ends for a design. The braid of the reinforcement layer is normally produced by common braiding processes such as rotary and maypole in 2×2 and 3×3 configurations where bobbins are placed onto each of the machines carriers. Braiding machines may be arranged in vertical or horizontal configuration. The nature of the superpack design allows the reinforcement layer described herein to be produced on many types of braiding machines with different configurations. Superpack braids may also be combined with laminated or wrapped fabrics, polymer sheeting, metallic sheeting, or spiraled textiles or wires.

Cover layers (and optional friction layers) can be applied via crosshead extrusion, lamination, or wrapping. A variety of other processes can also be used, such as liquid coating, spraying, or powder coating.

When thermoset or curable materials are used in the manufacturing process, the hose may be processed uncovered (optionally with lubricants) or covered in plastics or fabrics. The curing is often accomplished with the application of pressurized steam. However other means of heating such as hot air convection, fluidized beds of salts or other media, infrared exposure, microwave, etc., can also be used.

As needed, the mandrel is extracted by pressurized fluids, pulled through a die, or other methods and combinations thereof.

The pressure hose described herein can provide product advantages such as by decreasing weight (up to 40%), decreasing minimum bend radius (up to 70%), and/or increasing flexibility (by decreasing force to bend up to 30%). Any or all of these improvements may be used to improve the functionality of all materials. Lower cost, more common materials may be used to cover a broader range of applications, and high-performance materials can be used to extend the application of braided products to new areas which could not previously be serviced. Some or all of these advantages can be achieved while using a reduced number of braided reinforcement layers from existing products. An increase in hydrostatic and impulse pressure capabilities exhibited by the pressure hoses described herein is achieved with consistent product performance above the minimum requirements, unlike previously known products.

Improvements in hose pressure performance can be accomplished by the superpack geometry described herein offering a higher surface area to volume ratio for improved adhesion via mechanical entanglement, in conjunction with the mechanical properties of the superpack reducing processing defects, and the superpack density reducing application failure modes such as blowout failure of the tube material, and coupling leakage. Because of the greater wire density of the superpack geometry, improved functionality of the hose-coupling interface can be achieved, which provides enhanced leak resistance during thermal cycling and improved fire resistance. Furthermore, the technology described herein can support almost all application spaces for flexible fluid conveyance via the implementation of the described variations in tube and cover construction.

EXAMPLES

A pressure hose created with the superpack technology as described herein allows for the hose to meet standards of performance while offering additional application benefits. For example, the SAE J517 100R2 standard (2009 and after) specifies that a product use 2-steel wire braids to achieve the pressures listed in Table 1. Using the superpack technology described herein, meeting the SAE J517 100R2 standard is possible with 1-steel wire braid. These pressure requirements are common to other global industry standards such as EN 857 2SC, and ISO 11237. In Table 1 below, Sample 1 represents a pressure hose constructed with a superpack reinforcement layer as described herein, while Sample 2, Sample 3 and Sample 4 represent previously known pressures hoses that do not incorporate a superpack reinforcement layer.

TABLE 1

| ID Nom 1/16" | WP (Working Pressure) | | MBR (Minimum Bend Radius) | | | | Impulse Cycles (At 133% WP) | |
|---|---|---|---|---|---|---|---|---|
| | Sample 1 PSI | Samples 2, 3, and 4 PSI | Sample 1 In | Sample 2 in | Sample 3 in | Sample 4 in | Sample 1 Cycles | Samples 2, 3, and 4 Cycles |
| 4 | 5800 | 5800 | 2 | 4 | 3 | 2 | 600000 | 200000 |
| 6 | 4800 | 4785 | 2.5 | 5 | 3.5 | 2.5 | 600000 | 200000 |
| 8 | 4000 | 3990 | 3.5 | 7 | 5.1 | 3.5 | 600000 | 200000 |
| 10 | 3625 | 3625 | 4 | 8 | 6.75 | 4 | 600000 | 200000 |
| 12 | 3125 | 3125 | 4.75 | 9.5 | 8 | 4.75 | 600000 | 200000 |
| 16 | 2400 | 2400 | 6 | 11.8 | 10 | 6 | 600000 | 200000 |

In addition to the above improved performance advancements over previously known pressure hoses, the Sample 1 hose manufactured in accordance with embodiments described herein offer the added benefit of lighter weight and lower force to bend as illustrated in Table 2. Table 2 specifically provides a comparison of the Sample 1 hose manufactured in accordance with embodiments described herein to the previously known hoses Sample 5 and Sample 6 not employing a superpack design.

TABLE 2

| | Weight Reduction | | Force to Bend |
|---|---|---|---|
| Size | Sample 5 to Sample 1 | Sample 6 to Sample 1 | Sample 6 to Sample 1 |
| 8 | −32.8% | −17.8% | −14% |

The pressure hoses described herein which incorporate a superpack reinforcement layer can exhibit very high-pressure performance that previously was primarily met by other reinforcement technologies such as spiral wire. However, superpack products in these application spaces can offer application benefits such as smaller minimum bend radius, greater weight savings and flexibility improvements as compared to previously known braided products.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A pressure hose, comprising:
a tube layer defining an interior passageway of the pressure hose;
a single layer reinforcement layer disposed over the tube layer, the single layer reinforcement layer comprising:
a plurality of beams braided together around the tube layer, each of the beams comprising greater than or equal to 14 ends;
wherein the single layer reinforcement layer has a reinforcement volumetric ratio (RVR) of greater than or equal to 126%; and
a cover layer disposed over the reinforcement layer.

2. The pressure hose of claim 1, wherein the RVR is greater than or equal to 133%.

3. The pressure hose of claim 1, wherein the tube layer comprises a polymer material, a plastic material, a rubber material, or combinations thereof.

4. The pressure hose of claim 3, wherein the tube layer comprises less than 5 wt % white filler.

5. The pressure hose of claim 1, wherein the thickness of the tube layer is in the range of from 1.25 mm to 13 mm.

6. The pressure hose of claim 1, wherein the ends comprise a metal material, a textile material, a plastic material, a polymer material, an amorphous material, a crystalline material, a ceramic material, or a combination thereof.

7. The pressure hose of claim 1, wherein the ends comprise carbon fiber.

8. The pressure hose of claim 1, wherein the ends in each beam comprise a first group of ends and a second group of ends, and the material of the first group of ends is different from the material of the second group of ends.

9. The pressure hose of claim 8, wherein the first group of ends is made from carbon fiber and the second group of ends is made from steel.

10. The pressure hose of claim 1, wherein:
the ends within each beam are arranged in a multiple-layer orientation such that the ends within the beam have varying overall length; and
each beam of the plurality of beams includes the same number of ends arranged in an identical multiple-layer orientation such that all of the beams in the reinforcement layer have the same overall length.

11. The pressure hose of claim 10, wherein the diameter of the ends in each beam is the range of from 0.2 mm to 0.5 mm.

12. The pressure hose of claim 10, wherein the ends within each beam have a circular cross section, and the ends are divided into a first group of ends having a first diameter and a second group of ends having a second diameter larger than the first diameter.

13. The pressure hose of claim 12, wherein the first group of ends having a first diameter are located proximate the exterior of the beams and the second group of ends having a second diameter are located proximate the center of the beams.

14. The pressure hose of claim 10, wherein the ends are divided into a first group of ends having a first cross-sectional shape and a second group of ends having a second cross-sectional shape different from the first cross-sectional shape.

15. The pressure hose of claim 10, wherein the ends are divided into a first group of ends having a first tensile strength and a second group of ends having a second tensile strength greater than the first tensile strength.

16. The pressure hose of claim 15, wherein the first group of ends having a first tensile strength are located proximate the exterior of the beams and the second group of ends having a second tensile strength are located proximate the center of beams.

17. The pressure hose of claim 10, wherein the ends comprise carbon fiber.

18. The pressure hose of claim 10, wherein the ends are divided into a first group of ends that are carbon fiber ends and a second group of ends that are steel ends.

19. A pressure hose, comprising:
a tube layer defining an interior passageway of the pressure hose;
a single layer reinforcement layer disposed over the tube layer, the single layer reinforcement layer comprising:
a plurality of beams braided together around the tube layer, each of the beams comprising a plurality of ends;
wherein the plurality of ends within each beam are arranged in a multiple-layer orientation such that the ends within the beam have varying overall length;
wherein each beam of the plurality of beams includes the same number of ends arranged in an identical multiple-layer orientation such that all of the beams in the reinforcement layer have the same overall length; and
wherein the single layer reinforcement layer has a reinforcement volumetric ratio (RVR) of greater than or equal to 126%; and
a cover layer disposed over the reinforcement layer.

20. The pressure hose of claim 19, wherein the number of ends in each beam is greater than or equal to 14.

21. The pressure hose of claim 19, wherein the diameter of the ends in each beam is the range of from 0.2 mm to 0.5 mm.

22. The pressure hose of claim 19, wherein the ends within each beam have a circular cross section, and the plurality of ends comprises a first group of ends having a first diameter and a second group of ends having a second diameter larger than the first diameter.

23. The pressure hose of claim 22, wherein the first group of ends having a first diameter are located proximate the exterior of the beams and the second group of ends having a second diameter are located proximate the center of the beams.

24. The pressure hose of claim 19, wherein the plurality of ends comprises a first group of ends having a first cross-sectional shape and a second group of ends having a second cross-sectional shape different from the first cross-sectional shape.

25. The pressure hose of claim 19, wherein the plurality of ends comprises a first group of ends having a first tensile strength and a second group of ends having a second tensile strength greater than the first tensile strength.

26. The pressure hose of claim 25, wherein the first group of ends having a first tensile strength are located proximate the exterior of the beams and the second group of ends having a second tensile strength are located proximate the center of beams.

27. The pressure hose of claim 19, wherein the plurality of ends is a plurality of carbon fiber ends.

28. The pressure hose of claim 19, wherein the plurality of ends comprises a first group of ends that are carbon fiber ends and a second group of ends that are steel ends.

* * * * *